US011271784B2

United States Patent
Ito (10) Patent No.: US 11,271,784 B2
(45) Date of Patent: Mar. 8, 2022

(54) WIRELESS COMMUNICATION DEVICE AND FREQUENCY OFFSET COMPENSATION METHOD FOR WIRELESS COMMUNICATION DEVICE

(71) Applicant: Hitachi Kokusai Electric Inc., Tokyo (JP)

(72) Inventor: Kei Ito, Kodaira (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 16/957,145

(22) PCT Filed: Feb. 19, 2018

(86) PCT No.: PCT/JP2018/005732
§ 371 (c)(1),
(2) Date: Jun. 23, 2020

(87) PCT Pub. No.: WO2019/159358
PCT Pub. Date: Aug. 22, 2019

(65) Prior Publication Data
US 2020/0336345 A1 Oct. 22, 2020

(51) Int. Cl.
H04L 27/00 (2006.01)
H04B 1/713 (2011.01)
H04L 5/00 (2006.01)

(52) U.S. Cl.
CPC ......... H04L 27/0014 (2013.01); H04B 1/713 (2013.01); H04L 5/0005 (2013.01); H04L 2027/0026 (2013.01)

(58) Field of Classification Search
CPC ............. H04W 76/19; H04W 72/0453; H04W 72/1278; H04L 25/0226; H04L 5/0051;
(Continued)

(56) References Cited

U.S. PATENT DOCUMENTS

2006/0274820 A1 12/2006 Walton et al.
2007/0133658 A1 6/2007 Shin et al.
(Continued)

FOREIGN PATENT DOCUMENTS

EP 2343835 A1 7/2011
JP 2008-546312 A 12/2008
(Continued)

OTHER PUBLICATIONS

International Search Report of PCT/JP2018/005732 dated May 15, 2018.

*Primary Examiner* — Iqbal Zaidi
(74) *Attorney, Agent, or Firm* — Mattingly & Malur, PC (57) ABSTRACT

A wireless communication device includes frequency hopping means for changing a radio frequency based on a temporarily defined pattern, and a frequency offset compensation unit. The frequency offset compensation unit includes a frequency offset calculator that calculates a frequency offset amount from a received signal, a hopping frequency value converter that uses the frequency offset amount, a radio frequency from which the frequency offset amount is calculated, and a transition destination radio frequency transitioned by the frequency hopping means to calculate an estimated frequency offset value for the transition destination radio frequency, and a rotator that uses the estimated frequency offset value for the transition destination radio frequency to perform phase rotation on the received signal.

4 Claims, 8 Drawing Sheets

(58) Field of Classification Search
CPC ........ H04B 1/7136; H04B 1/44; H04B 1/713; H04J 3/06; H04J 11/00
See application file for complete search history.

(56) References Cited

U.S. PATENT DOCUMENTS

| | | |
|---|---|---|
| 2012/0020388 A1 | 1/2012 | Yokoshima |
| 2012/0087263 A1 | 4/2012 | Li et al. |
| 2012/0281791 A1 | 11/2012 | Tsuchida |
| 2021/0083751 A1* | 3/2021 | Chen .................. H04L 5/00 |

FOREIGN PATENT DOCUMENTS

| | | |
|---|---|---|
| JP | 2009-141634 A | 6/2009 |
| JP | 2012-29158 A | 2/2012 |
| JP | 2012-511269 A | 5/2012 |
| JP | 2012-235328 A | 11/2012 |
| JP | 2012-531856 A | 12/2012 |

* cited by examiner

| RADIO FREQUENCY | \\ SYMBOL NUMBER | | | | | | | | | | | |
|---|---|---|---|---|---|---|---|---|---|---|---|---|
| | 0 | 1 | 2 | 3 | 4 | 5 | 6 | 7 | 8 | 9 | 10 | ..... |
| $f_0$ | A | A | | | | | | | | | | |
| $f_1$ | B | B | | | | | | | A | A | | |
| $f_2$ | | | | | B | B | | | | | | ..... |
| $f_3$ | | | | | A | A | | | | | | |
| $f_4$ | | | | | | | | | | | | |
| $f_5$ | | | | | | | | | B | B | | |

PREAMBLE SECTION (arrow to symbol 0, $f_0$/$f_1$)
X (arrow to symbol 9, $f_1$)

A: USED BY FIRST TRANSMISSION AND RECEPTION SYSTEM
B: USED BY SECOND TRANSMISSION AND RECEPTION SYSTEM

FIG. 7

| RADIO FREQUENCY | FREQUENCY OFFSET AMOUNT |
|---|---|
| $f_0$ | 100 |
| $f_1$ | 180 |
| $f_2$ | Null |
| $f_3$ | Null |
| $f_4$ | Null |
| $f_5$ | Null |

FIG. 9

WIRELESS COMMUNICATION DEVICE AND FREQUENCY OFFSET COMPENSATION METHOD FOR WIRELESS COMMUNICATION DEVICE

TECHNICAL FIELD

The present disclosure relates to a wireless communication device and is applicable to, for example, a wireless communication device that performs frequency hopping.

BACKGROUND ART

To compensate for a frequency offset in orthogonal frequency-division multiplexing (OFDM) wireless communication in which frequency hopping is performed to switch between frequencies of carrier waves to be transmitted and received in a predetermined period and a predetermined pattern, a general method is one for using a guard interval correlation value of a received signal to calculate a frequency offset from a phase difference between a real number of a correlation peak and an imaginary number of the correlation peak and remove the frequency offset by a rotator. For transmission in units of frames, there is also a method for fixing a frequency offset value calculated with a known preamble symbol added to the top of a frame as a frequency offset value of the frame.

CITATION LIST

Patent Literature

PTL 1: Japanese Patent Application Laid-Open No. 2012-235328
PTL 2: Japanese Patent Application Laid-Open No. 2009-141634
PTL 3: Japanese Unexamined Patent Application Publication (Translation of PCT Application) No. 2012-531856
PTL 4: Japanese Unexamined Patent Application Publication (Translation of PCT Application) No. 2012-511269

SUMMARY OF INVENTION

Technical Problem

However, since a frequency offset amount is changed for a wireless frequency of a transition destination by performing frequency hopping, recalculation needs to be performed. In the calculation performed by the foregoing method using the guard interval correlation, the top of a guard interval in an OFDM symbol immediately after the frequency hopping is reduced due to an effect of activation of a power amplifier, and thus the accuracy of the frequency offset amount calculated using the guard interval correlation is reduced. In addition, to avoid this, a method for adding a preamble signal after the frequency hopping is considered. However, there is a problem that a transmission rate of an entire system decreases.

An object of the present disclosure is to provide a wireless communication device of which throughput is improved.

Solution to Problem

An overview of a representative aspect of the present disclosure is described as follows.

That is, a wireless communication device includes frequency hopping means for changing a radio frequency based on a temporarily defined pattern, and a frequency offset compensation unit. The frequency offset compensation unit includes a frequency offset calculator that calculates a frequency offset amount from a received signal, a hopping frequency value converter that uses the frequency offset amount, a radio frequency from which the frequency offset amount is calculated, and a transition destination radio frequency transitioned by the frequency hopping means to calculate an estimated frequency offset value for the transition destination radio frequency, and a rotator that uses the estimated frequency offset value for the transition destination radio frequency to perform phase rotation on the received signal.

Advantageous Effects of Invention

According to the foregoing wireless communication device, throughput can be improved.

DESCRIPTION OF EMBODIMENTS

First, a wireless communication device according to an embodiment is described below.

(1) The wireless communication device includes frequency hopping means for changing a radio frequency based on a temporarily defined pattern, and frequency offset compensating means. The frequency offset compensating means includes means for calculating a frequency offset amount from a received signal, means for using the frequency offset amount, a radio frequency from which the frequency offset amount is calculated, and a transition destination radio frequency transitioned by the frequency hopping means to calculate an estimated frequency offset value for the transition destination radio frequency, and means for using the estimated frequency offset value for the transition destination radio frequency to perform phase rotation on the received signal. The frequency offset compensating means performs frequency offset compensation. This wireless communication device is, for example, achieved by a wireless communication device according to Example 1 described later.

(2) The wireless communication device described in the foregoing (1) further includes a frequency division multiplexing function of dividing a single transmission stream into a plurality of transmission streams, transmitting the transmission streams at different radio frequencies from a plurality of antennas, receiving a plurality of streams of different radio frequencies via the plurality of antennas, and synthesizing the plurality of received streams into a single received stream, and means for storing radio frequencies for receiving branches obtained from the plurality of received streams of the frequencies, and frequency offset amounts calculated by each of the receiving branches. When a radio frequency transitioned by hopping is a radio frequency from which the frequency offset amount is calculated by another branch, frequency offset compensation is performed using the stored frequency offset amounts. This wireless communication device is, for example, achieved by a wireless communication device according to Example 2 described later.

(3) The wireless communication device described in the foregoing (2) further includes means for calculating cross-correlation of a known signal with respect to the received signal used to calculate the frequency offset amounts from the received streams, means for calculating, from results of calculating the cross-correlation of the received streams, weighting coefficients by which the frequency offset values are multiplied, and means for performing weighted averaging using the weighting coefficients to estimate the transition destination frequency offset amount. The transition destination frequency offset amount is estimated by the means for performing the weighted averaging. This wireless communication is, for example, achieved by a wireless communication device according to Example 3 described later.

Hereinafter, examples are described using the drawings. In the following description, however, the same constituent elements are indicated by the same reference signs and a repetitive description is omitted in some cases.

Example 1

Figure 1:
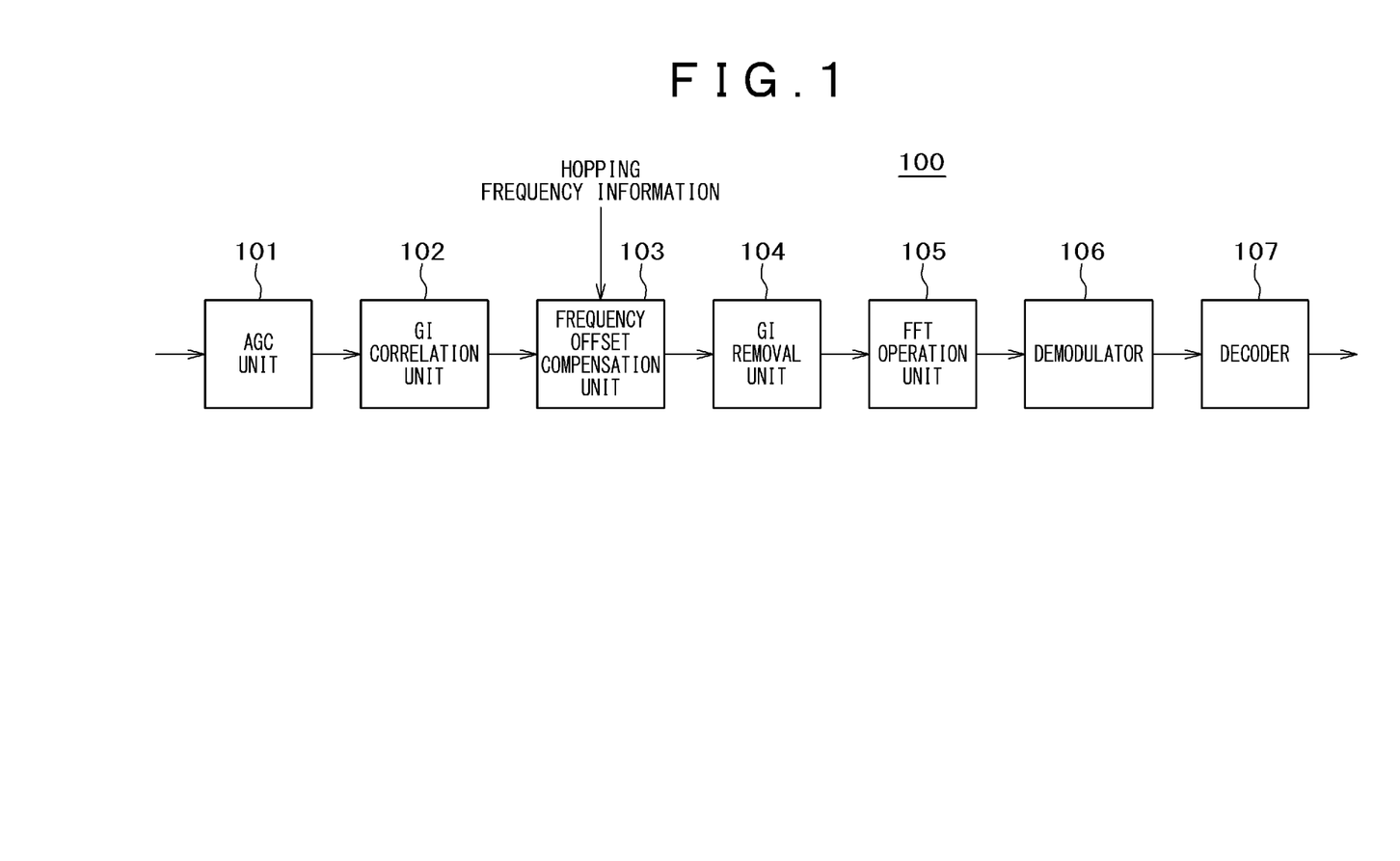
FIG. 1 is a diagram illustrating a configuration of a digital signal processing unit of a wireless communication device according to Example 1.
Figure 2:
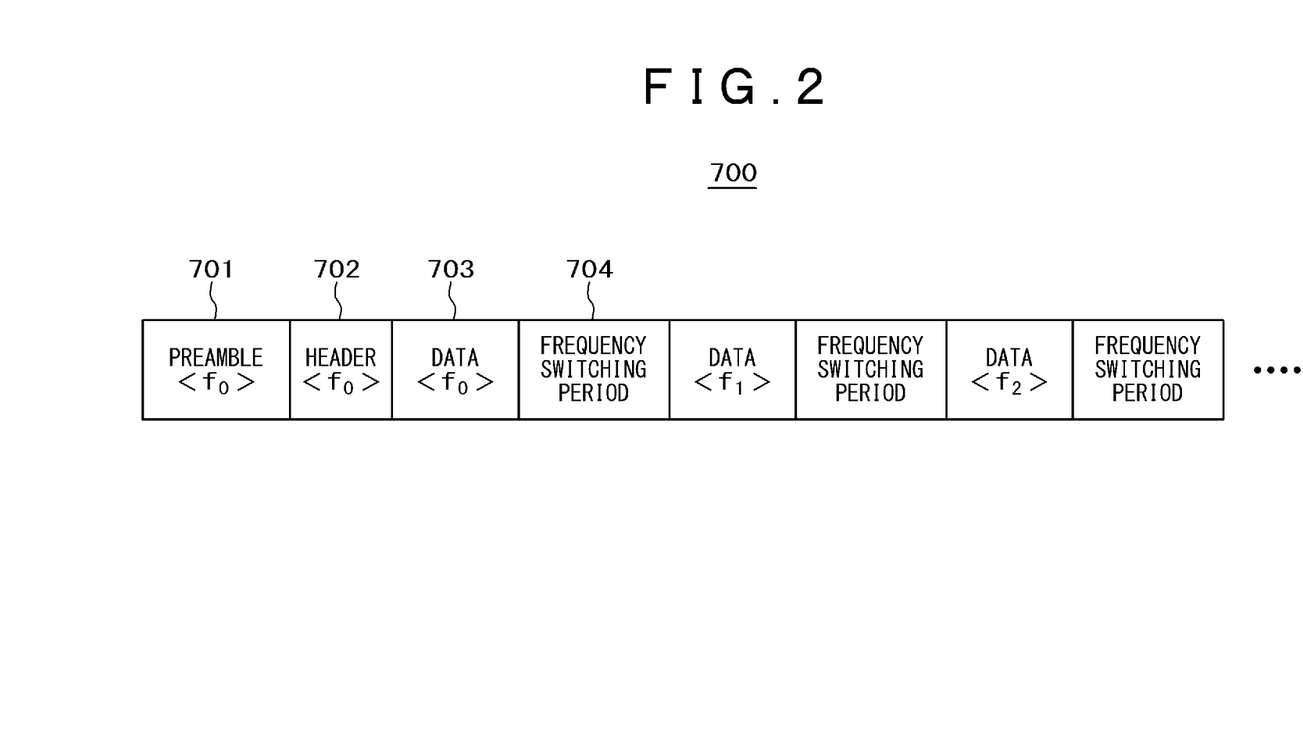
FIG. 2 is a diagram illustrating an example of a configuration of a transmission frame.
Figure 3:
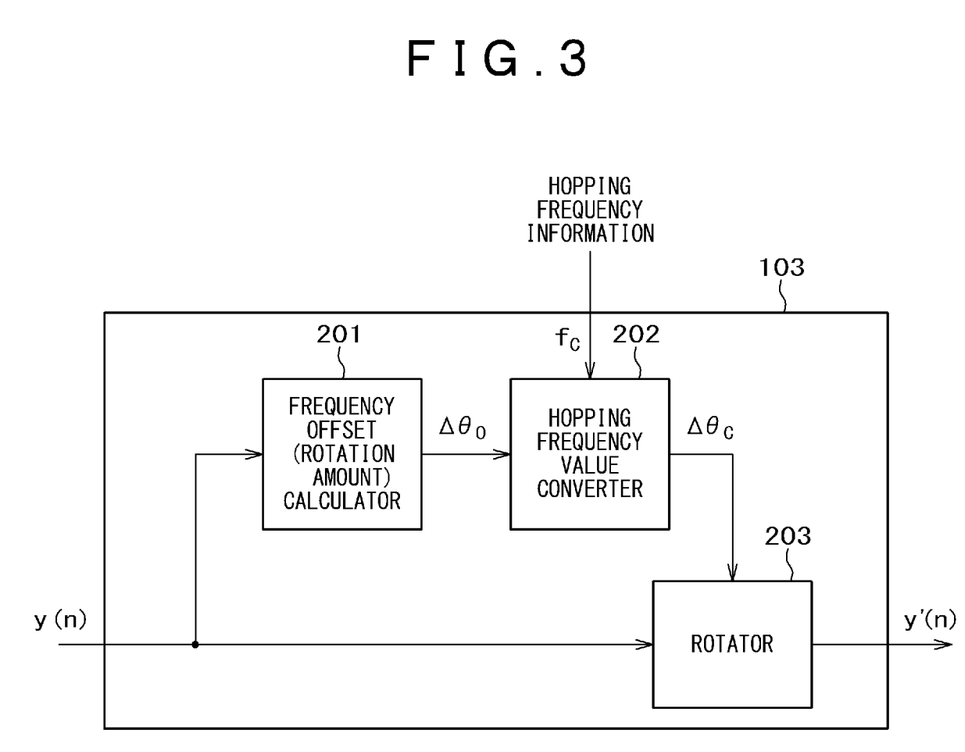
FIG. 3 is a diagram illustrating a configuration of a frequency offset compensation unit illustrated in FIG. 1.

The wireless communication device according to Example 1 is described using FIGS. 1 to 3. FIG. 1 illustrates a configuration of a digital signal processing unit of the wireless communication device according to Example 1. The digital signal processing unit 100 of the wireless communication device according to Example 1 includes an auto gain controller (AGC) unit 101, a guard interval correlation operation unit (GI correlation operation unit) 102, a frequency offset compensation unit 103, a guard interval removal unit (GI removal unit) 104, an FFT operation unit 105, a demodulator 106, and a decoder 107. The wireless communication device includes an A/D converter (not illustrated), a radio frequency (RF) unit (not illustrated), and antennas (not illustrated) on the upstream side of the AGC unit 101.

FIG. 2 illustrates an example of a transmission frame. A transmission frame 700 includes a preamble symbol (preamble) 701 for AGC/synchronous acquisition, a header symbol (header) 702 for storage of control information, data symbols (data) 703 for data transmission, and frequency switching periods 704. In each of the frequency switching periods 704, a frequency switching process is performed by the RF unit. In addition, <f*> described in the symbols illustrated in FIG. 2 indicates hopping frequencies ($f_0$, $f_1$, $f_2$, ...). The transmission frame 700 does not have a preamble for each time of hopping.

The AGC unit 101 calculates signal power of an input time signal and corrects an amplitude value so that the signal power is equal to predetermined signal power. Then, the AGC unit 101 outputs the input time signal with the corrected amplitude value to the guard interval correlation operation unit 102.

The guard interval correlation operation unit 102 calculates correlation with a sample-delayed signal for an effective symbol length (the number of FFT points) and outputs I and Q component values of a guard interval correlation power peak value and the input time signal to the frequency offset compensation unit 103.

For example, the frequency offset compensation unit 103 calculates a phase from the I and Q component values of the correlation power peak value and estimates a frequency offset amount for a hopping frequency from the calculated phase and information of the hopping frequency. Then, the frequency offset compensation unit 103 calculates a phase rotation amount from the estimated frequency offset amount, uses a rotator to perform rotation correction, and outputs the phase rotation amount to the guard interval removal unit 104. The foregoing hopping frequency information is supplied from frequency hopping means as an upper layer for changing a radio frequency based on a temporarily defined pattern. The frequency offset compensation unit 103 is described using FIG. 3.

FIG. 3 illustrates a configuration of the frequency offset compensation unit 103. The frequency offset compensation unit 103 includes a frequency offset (rotation amount) calculator 201, a hopping frequency value converter 202, and a rotator 203.

The frequency offset (rotation amount) calculator 201 calculates a rotation amount ($\Delta\theta_0$) (proportional to the frequency offset ($f_d$)) using the I and Q component values of the guard interval correlation power peak value. When the I and Q component values of the guard interval correlation power peak value are $C_{GI,I}$ and $C_{GI,Q}$, and a subcarrier interval is $f_{sc}$, the frequency offset amount (rotation amount) ($\Delta\theta_0$) is expressed according to the following Equation (1).

[Equation 1]

$$\Delta\theta_0 = Arg\left[\frac{C_{GI,Q}}{C_{GI,I}}\right] = \frac{2\pi \cdot f_d}{f_{SC}} \quad (1)$$

The hopping frequency value converter 202 performs the following calculation to convert the frequency offset amount (rotation amount) ($\Delta\theta_0$) into a frequency offset amount for the radio frequency and outputs the converted frequency offset amount (rotation amount) ($\Delta\theta_c$) to the rotator 203. When a radio frequency for a preamble section is $f_0$, and a radio frequency of a transition destination is $f_c$, the frequency offset amount (rotation amount) ($\Delta\theta_c$) after the conversion is calculated according to the following Equation (2).

[Equation 2]

$$\Delta\theta_C = \Delta\theta_0 \cdot \frac{f_C}{f_0} \quad (2)$$

Equation (2) is described below. When frequency offset amounts for radio frequencies $f_0$ and $f_c$ at a moving speed v are $f_{d0}$ and $f_{dc}$, and the speed of light is c, the following Equations (3) and (4) are as follows.

[Equation 3]
$$f_{do} = \frac{v}{c} f_o \cos\theta \quad (3)$$

[Equation 4]
$$f_{dC} = \frac{v}{c} f_C \cos\theta \quad (4)$$

When Equations (3) and (4) are arranged, the following Equation (5) is obtained and the frequency offset amount can be calculated as the ratio of the radio frequencies. The frequency offset amount calculated by the hopping frequency value converter 202 is referred to as estimated frequency offset value.

[Equation 5]
$$f_{dC} = f_{d0} \frac{f_C}{f_0} \quad (5)$$

The rotator 203 performs phase rotation using, as a rotational amount of the rotator, the frequency offset amount ($\Delta\theta_c$) calculated by the hopping frequency value converter 202. When a signal after the phase rotation is y'(n), a signal before the phase rotation is y(n), and the number of samples in a guard interval is $N_{GI}$, the phase rotation is calculated according to the following Equation (6).

[Equation 6]
$$y'(n) = y(n) \cdot e^{-j \cdot \Delta\theta_c n / N_{GI}} \quad (6)$$

Although the present example describes the feedforward type frequency offset compensation unit, the frequency offset compensation unit may be a feedback type frequency offset compensation unit.

The guard interval removal unit 104 uses peaks of guard interval correlation and preamble correlation to detect the top of symbols, removes a guard interval section from the received time signal, and outputs the received time signal to the FFT operation unit 105.

The FFT operation unit 105 outputs, to the demodulator 106, a received frequency signal obtained by performing fast Fourier transform on the received time signal from which the guard interval section was removed.

The demodulator 106 performs channel equalization on the received frequency signal and outputs a received bit log-likelihood ratio or a demodulation result of a hard decision result to the decoder 107.

The decoder 107 performs error correction on the demodulation result and outputs a received bit sequence subjected to the error correction.

In the present example, since the estimated frequency offset value for the hopping frequency is calculated from the frequency offset amount calculated for the preamble section and the hopping frequency, and the frequency offset compensation is performed, a preamble to be used to calculate a frequency offset amount for each time of the hopping is not required and throughput can be improved.

Example 2

Figure 4:
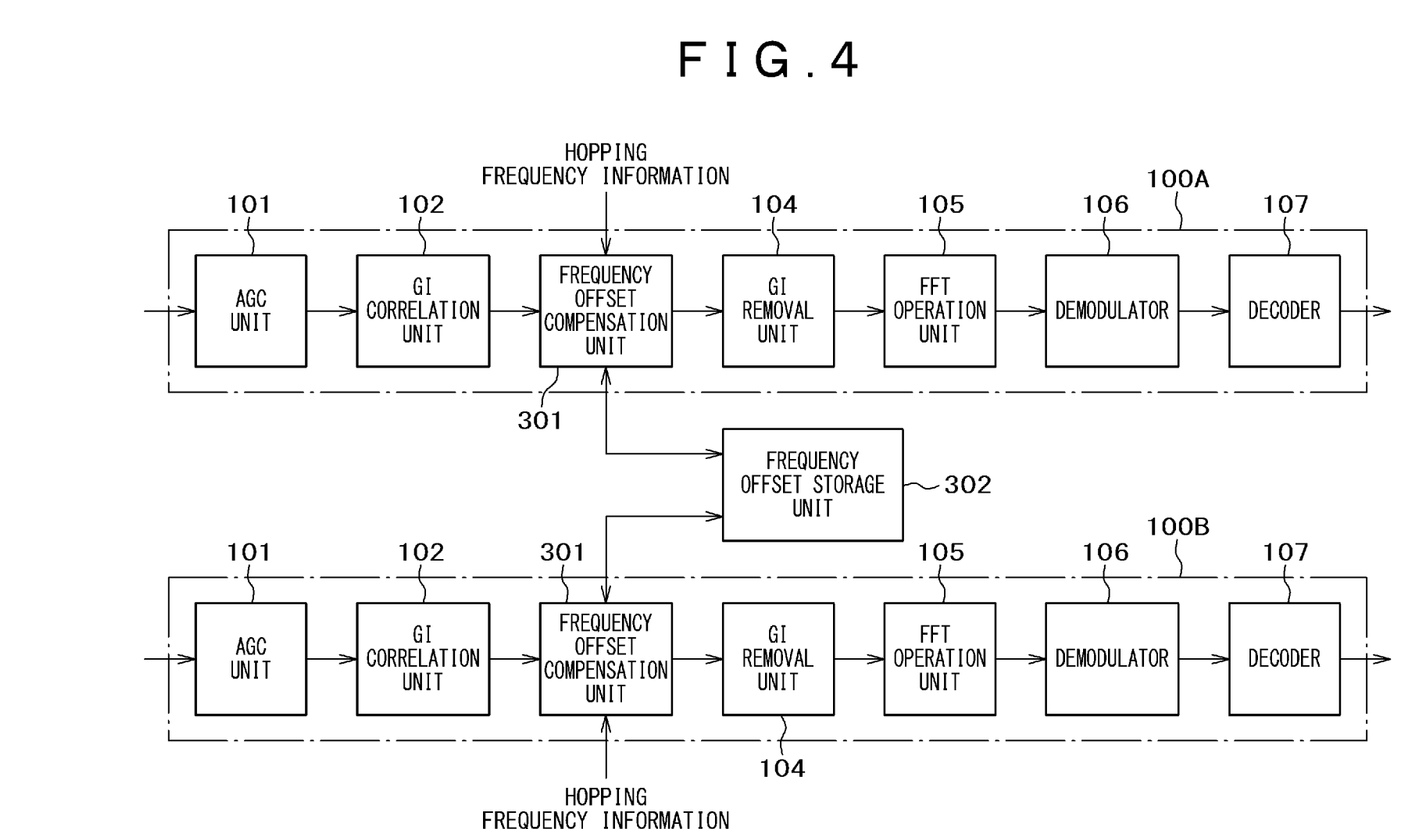
FIG. 4 is a diagram illustrating a configuration of a digital signal processing unit of a wireless communication device according to Example 2.
Figure 5:
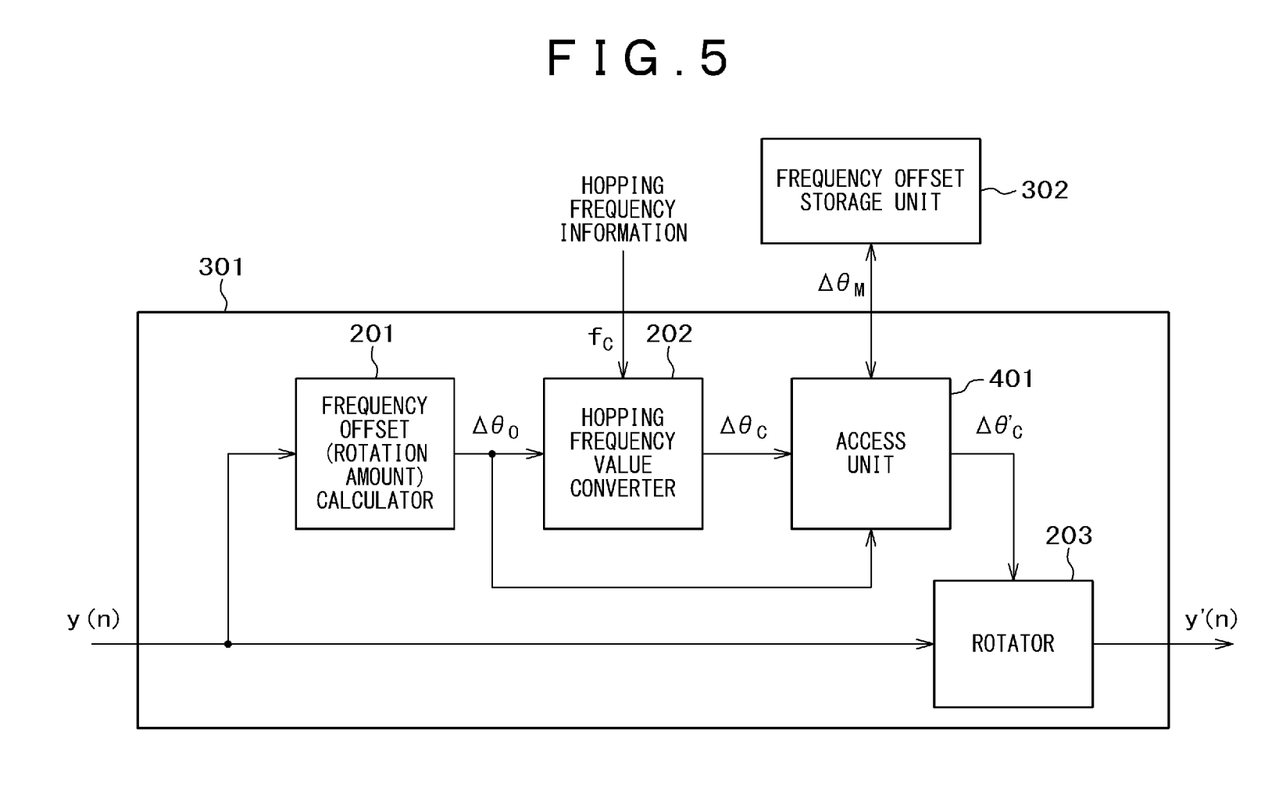
FIG. 5 is a diagram illustrating a configuration of each of frequency offset compensation units illustrated in FIG. 4.
Figure 6:
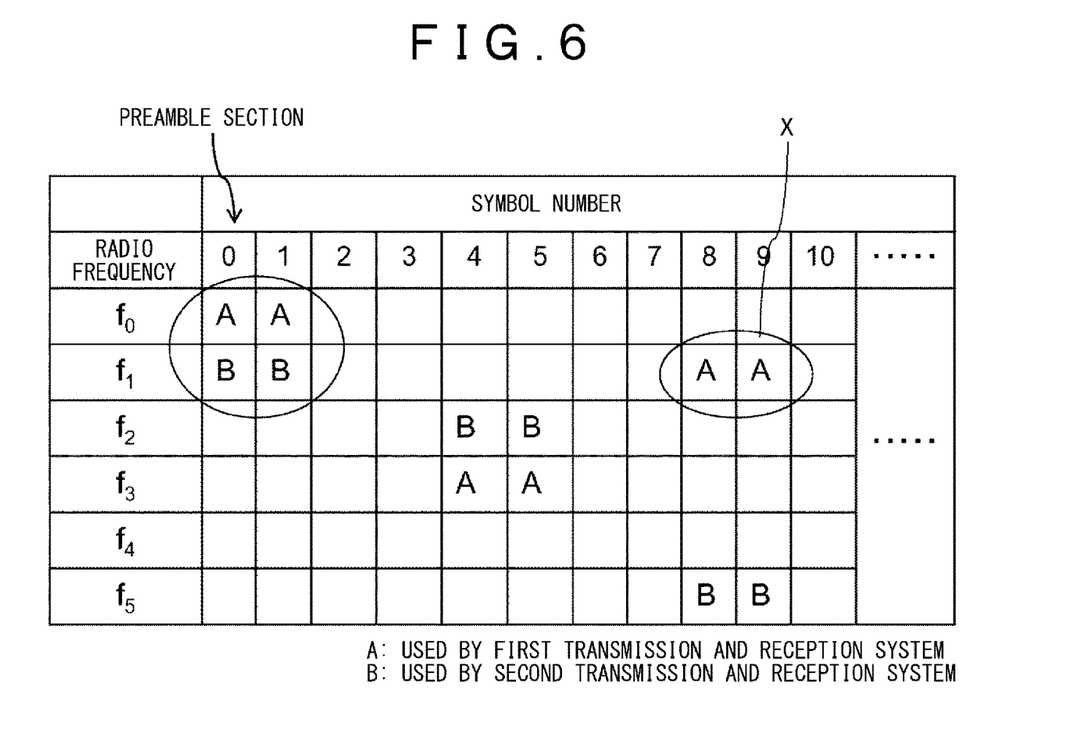
FIG. 6 is a diagram illustrating an example of a frequency direction and a symbol (time) direction when frequency division multiplexing and frequency hopping according to Example 2 are used.

The wireless communication device according to Example 2 is described using FIGS. 4 to 6. The wireless communication device according to Example 2 uses frequency division multiplexing (what is called carrier aggregation) and frequency hopping. Specifically, the wireless communication device according to Example 2 is in a frequency division multiplexing wireless communication system that divides a single transmission stream into multiple transmission streams, transmits the transmission streams at different radio frequencies from multiple antennas, receives streams of different radio frequencies via the multiple antennas, and synthesizes the multiple received streams into a single received stream.

FIG. 4 illustrates a configuration of a digital signal processing unit of the wireless communication device according to Example 2. The wireless communication device according to Example 2 includes a first receiving branch 100A for processing a first received stream of a first radio frequency, a second receiving branch 100B for processing a second received stream of a second radio frequency, and a frequency offset storage unit 302. Each of digital signal processing units of the first and second receiving branches 100A and 100B includes the AGC unit 101, the guard interval correlation operation unit 102, a frequency offset compensation unit 301, the guard interval removal unit 104, the FFT operation unit 105, the demodulator 106, and the decoder 107.

The AGC unit 101, the guard interval correlation operation unit 102, the guard interval removal unit 104, the FFT operation unit 105, the demodulator 106, and the decoder 107 are the same as those described in Example 1, and a description thereof is omitted.

Each of the frequency offset compensation units 301 has the functions of the frequency offset compensation unit 103 according to Example 1 and has access to the frequency offset storage unit 302. As specific operations, two operations are performed. That is, frequency offset amounts calculated for a preamble section and radio frequencies are stored in the frequency offset storage unit 302. During frequency hopping, when a frequency offset amount for a radio frequency (radio frequency of a hopping transition destination) allocated exists in the frequency offset storage unit 302, the frequency offset amount is used.

FIG. 5 illustrates a configuration of each of the frequency offset compensation units 301. Each of the frequency offset compensation units 301 includes a frequency offset (rotation amount) calculator 201, a hopping frequency value converter 202, an access unit 401, and a rotator 203.

The frequency offset (rotation amount) calculator 201, the hopping frequency value converter 202, and the rotator 203 are the same as those described in Example 1, and a description thereof is omitted.

In the preamble section, the access unit 401 accesses the frequency offset storage unit 302 to write, to the frequency offset storage unit 302, the frequency offset amount ($\Delta\theta_0$) calculated by the frequency offset (rotation amount) calculator 201 as $\Delta\theta_M$. During frequency hopping, when the frequency offset amount for the radio frequency of the hopping transition destination exists in the frequency offset storage unit 302, the access unit 401 performs an operation of causing the rotator 203 to use the frequency offset amount ($\Delta\theta_M$) read from the frequency offset storage unit 302.

FIG. 6 illustrates an example of a hopping pattern. A vertical direction indicates radio frequencies, a horizontal direction indicates symbol numbers, "A" indicates that a radio frequency indicated on the leftmost side is used by a first transmission and reception system in transmission and reception of a concerned symbol, and "B" indicates that a radio frequency indicated on the leftmost side is used by a second transmission and reception system in transmission and reception of a concerned symbol. A symbol number 0 corresponds to a preamble section. In the example illustrated in FIG. 6, "A's" of symbol numbers 8 and 9 that are surrounded by an ellipse X indicate that the first receiving branch (first transmission and reception system) can use a frequency offset amount for a radio frequency $f_1$ that was calculated by the second receiving branch (second transmission and reception system) for the preamble section.

The frequency offset storage unit 302 stores the frequency offset amounts calculated by the receiving branches (transmission and reception systems) for the preamble section. During frequency hopping, when the frequency offset amount for the radio frequency of the hopping transition destination is stored, the frequency offset amount is read to perform the frequency offset compensation using the frequency offset amount.

Figure 7:
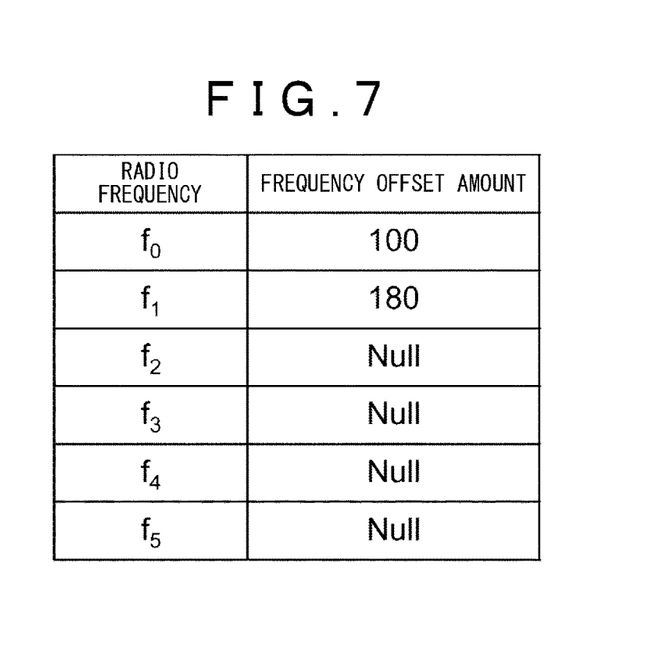
FIG. 7 is a diagram illustrating an example of a frequency offset storage unit illustrated in FIG. 5.

FIG. 7 illustrates an example of stored frequency offset amounts. A table storing frequency offset amounts for radio frequencies is provided. A frequency offset amount for a radio frequency at which a preamble is not received is Null.

The present example describes an example in which the number of frequencies into which a frequency band is divided by the frequency division multiplexing is 2. However, the number may be 3 or more. Even when the number is 3 or more, the number of systems of receiving units is increased and a configuration in which the single frequency offset storage unit 302 is accessed is used.

In the present example, in the device that uses the frequency division multiplexing and the frequency hopping, the frequency offset amounts calculated by the receiving branches for the preamble section and the hopping frequencies are stored. When the radio frequency of the hopping transition destination matches a radio frequency (hopping frequency) of a preamble of any of the receiving branches, the frequency offset compensation is performed using a calculated value of the radio frequency of the preamble without using an estimated value obtained using the ratio of radio frequencies. Therefore, it is not necessary to calculate an estimated frequency offset value for the radio frequency of the hopping transition destination.

Example 3

Figure 8:
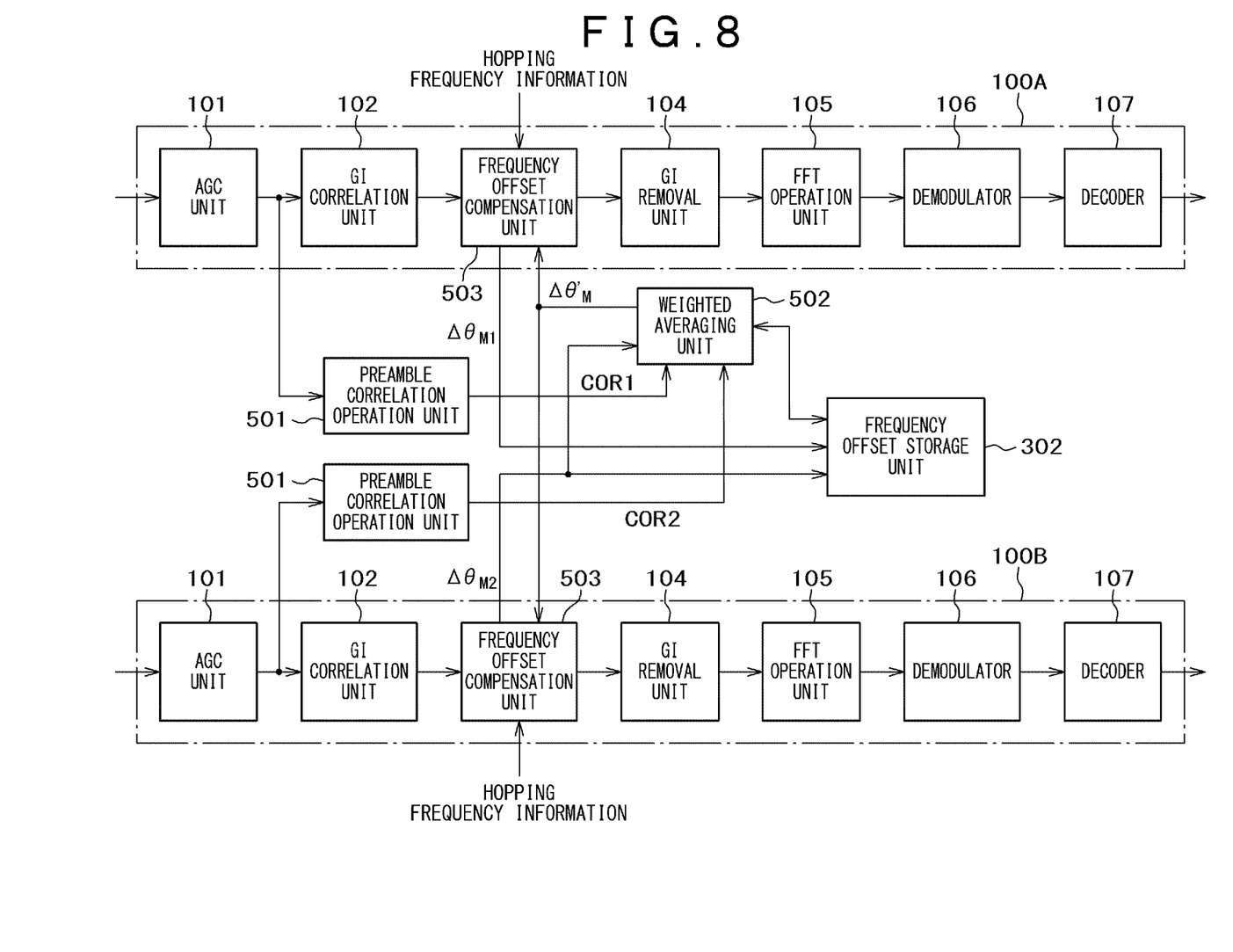
FIG. 8 is a diagram illustrating a configuration of a digital signal processing unit of a wireless communication device according to Example 3.

The wireless communication device according to Example 3 is described using FIG. 8. The wireless communication device according to Example 3 uses the frequency division multiplexing and the frequency hopping, like Example 2. FIG. 8 illustrates a configuration of a digital signal processing unit of the wireless communication device according to Example 3. The wireless communication device according to Example 3 includes a first receiving branch 200A as a first received stream of a first radio frequency, a second receiving branch 200B as a second received stream of a second radio frequency, a frequency offset storage unit 302, a preamble correlation operation unit 501, and a weighted average calculator 502.

The frequency offset compensation units 503 included in digital signal processing units of the first and second receiving branches 200A and 200B and the frequency offset storage unit 302 are the same as those described in Example 2, and a description thereof is omitted.

Each of the preamble correlation operation units 501 calculates cross-correlation between a known preamble time signal and a received signal and outputs correlation power to the weighted average calculator 502.

The weighted average calculator 502 uses preamble correlation output COR1 and COR2 of the receiving branches to calculate weighting coefficients and performs weighted averaging using the weighting coefficients in the calculation of a frequency offset amount for a radio frequency of a hopping transition destination from frequency offset amounts calculated by the receiving branches for a preamble section.

First, the calculation of the weighting coefficients is described. When the correlation output of the first receiving branch is $r_1$ and the correlation output of the second receiving branch is $r_2$, the weighting coefficients ($\alpha_1$ and $\alpha_2$) are calculated according to the following Equations (7) and (8).

[Equation 7]
$$\alpha_1 = \frac{r_1}{r_1 + r_2} \quad (7)$$

[Equation 8]
$$\alpha_2 = \frac{r_2}{r_1 + r_2} \quad (8)$$

When the number of receiving branches is N, a weighting coefficient ($\alpha_n$) of an n-th receiving branch is calculated according to the following Equation (9).

[Equation 9]
$$\alpha_n = \frac{r_n}{\sum_{i=1}^{N} r_i} \quad (9)$$

By using the correlation output for the weighting coefficients, the reliability of the highly correlated branches can be improved.

Next, weighted averaging is described. The frequency offset amount for the radio frequency of the hopping transition destination that is obtained by the weighted averaging is calculated according to the following Equation (10) using the weighting coefficients calculated according to Equations (5), (7), and (8).

[Equation 10]
$$f_{dC} = \alpha_1 \cdot f_{d1} \frac{f_C}{f_1} + \alpha_2 \cdot f_{d2} \frac{f_C}{f_2} \quad (10)$$

A frequency offset amount for a radio frequency of a hopping transition destination that is obtained by the weighted averaging when the number of receiving branches is N is calculated according to the following Equation (11).

[Equation 11]
$$f_{dC} = \sum_{i=1}^{N} \left( \alpha_i \cdot f_{di} \frac{f_C}{f_i} \right) \quad (11)$$

However, frequency offset amounts for frequencies that are calculated by the receiving branches for the preamble section are not subjected to the weighted averaging, and calculated values are used without a change.

Figure 9:
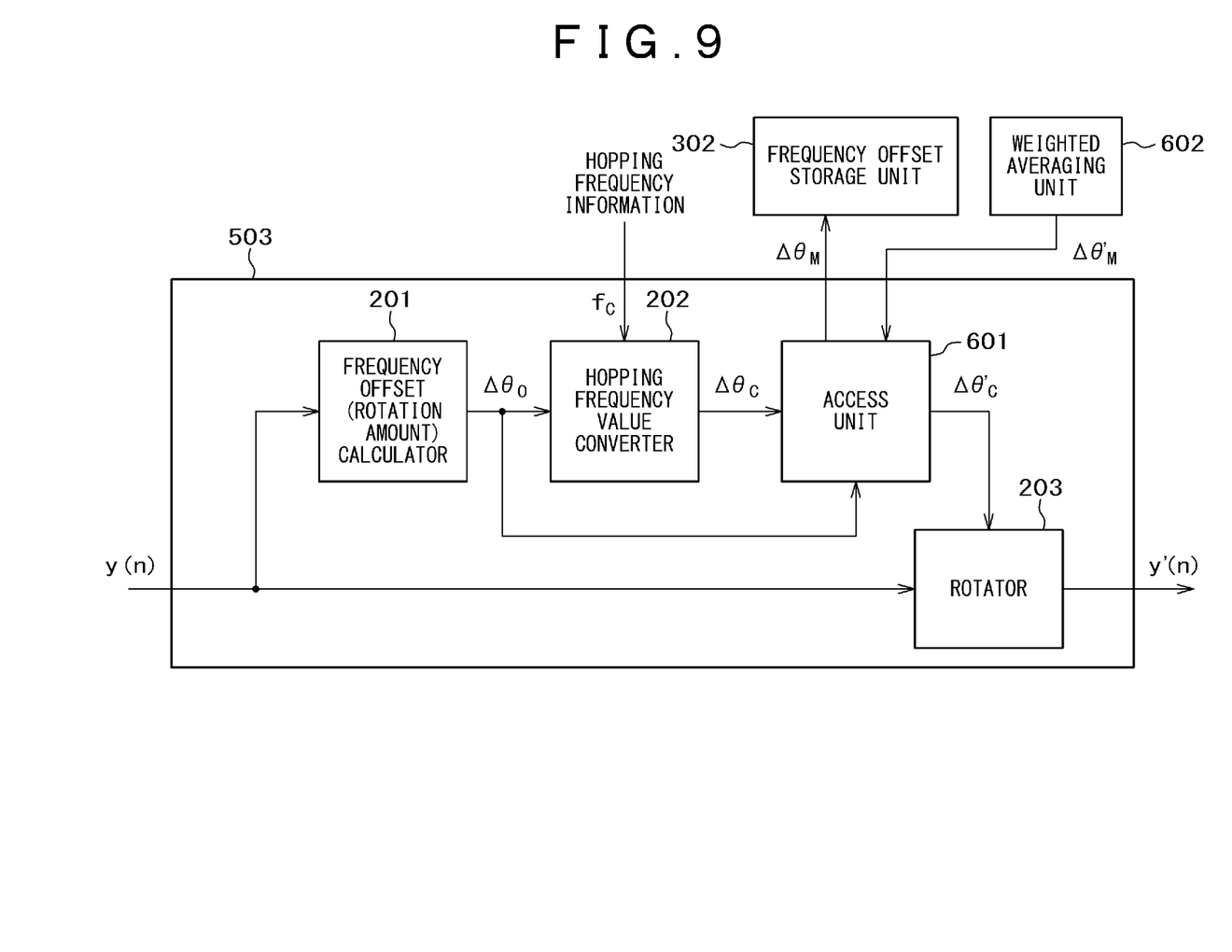
FIG. 9 is a diagram illustrating a configuration of each of frequency offset compensation units illustrated in FIG. 8.

FIG. 9 illustrates a configuration of each of the frequency offset compensation units 503. Each of the frequency offset compensation units 503 includes the frequency offset (rotation amount) calculator 201, the hopping frequency value converter 202, an access unit 601, and the rotator 203.

In the preamble section, the access unit 601 accesses the frequency offset storage unit 302 to write the calculated frequency offset amount ($\Delta\theta_0$) as $\Delta\theta_M$ to the frequency offset storage unit 302. During frequency hopping, when the frequency offset value for the radio frequency exists in the frequency offset storage unit 302, the access unit 601 reads the frequency offset value from the frequency offset storage unit 302 and performs an operation of causing the rotator 203 to use a frequency offset value ($\Delta\theta'_M$) calculated by the weighted average calculator 502.

In the present example, by performing the weighted averaging using preamble correlation output of each of the receiving branches, a frequency offset amount for a radio frequency of a hopping transition destination can be reliably estimated.

Although the invention achieved by the present inventors is concretely described based on the examples, the invention is not limited to the foregoing examples and can be variously changed.

REFERENCE SIGNS LIST

101 . . . AGC unit
102 . . . GI correlation unit
103 . . . Frequency offset compensation unit
104 . . . GI removal unit
105 . . . FFT operation unit
106 . . . Demodulator
107 . . . Decoder
201 . . . Frequency offset calculator
202 . . . Hopping frequency value converter
203 . . . Rotator
301 . . . Frequency offset compensation unit
302 . . . Frequency offset storage unit
401 . . . Access unit
501 . . . Preamble correlation operation unit
502 . . . Weighted average calculator
503 . . . Frequency offset compensation unit
601 . . . Access unit

The invention claimed is:

1. A wireless communication device comprising:
one or more digital signal processor configured to execute:
a plurality of receiving branches corresponding to a frequency division multiplexing function of receiving a plurality of streams of different radio frequencies via a plurality of antennas and synthesizing the plurality of received streams into a single received stream; and
storing radio frequencies obtained from the plurality of received streams for the receiving branches and frequency offset amounts calculated by the receiving branches,
wherein the one or more digital signal processor is further configured to execute, for each of the receiving branches:
changing a radio frequency based on a temporarily defined pattern,
calculating a frequency offset amount from a received signal;
a hopping frequency value converter that uses the frequency offset amount, a first radio frequency from which the frequency offset amount is calculated, and a transition destination radio frequency to calculate an estimated frequency offset value for the transition destination radio frequency; and
a rotator that uses the estimated frequency offset value for the transition destination radio frequency to perform phase rotation on the received signal,
wherein the radio frequency transitioned by hopping is a radio frequency from which the frequency offset amount is calculated by another of the receiving branches, and the rotator uses the stored frequency offset amounts to perform the phase rotation on the received signal.

2. The wireless communication device according to claim 1,
wherein the one or more digital signal processor is further configured to execute, for each of the receiving branches:
calculating a cross-correlation of a known signal with respect to the received signal used by the receiving branches to calculate the frequency offset amounts; and
calculating, from results of calculating the cross-correlation, weighting coefficients by which the frequency offset amounts are calculated, and calculates a frequency offset amount by using the weighting coefficients to perform weighted averaging on the stored frequency offset amounts,
wherein the rotator uses the frequency offset amount calculated by the weighted averaging unit to perform the phase rotation on the received signal.

3. A frequency offset compensation method for a wireless communication device which receives a plurality of streams of different radio frequencies via a plurality of antennas and synthesizes the plurality of received streams into a single received stream, comprising:
calculating a frequency offset amount from a received signal;
using the frequency offset amount, a first radio frequency from which the frequency offset amount is calculated, and a transition destination radio frequency to calculate an estimated frequency offset value for the transition destination radio frequency;
using the estimated frequency offset value for the transition destination radio frequency to perform phase rotation on the received signal;
storing radio frequencies of the received streams obtained from the plurality of received streams, and frequency offset amounts calculated for the received streams; and
using previously stored frequency offset amounts to perform the phase rotation on the received signal,
wherein the radio frequency transitioned by hopping is a radio frequency from which the frequency offset amount is calculated for another of the received streams.

4. The frequency offset compensation method for the wireless communication device according to claim 3, the method further comprising:
calculating cross-correlation of a known signal with respect to the received signal used to calculate the frequency offset amounts for the received streams;
calculating, from results of calculating the cross-correlation of the received streams, weighting coefficients by which the frequency offset amounts are multiplied;
using the weighting coefficients to perform weighted averaging on the previously stored frequency offset amounts and calculating a frequency offset amount; and using the frequency offset amount calculated via the weighted averaging to perform the phase rotation on the received signal.

\* \* \* \* \*